(12) United States Patent
Li et al.

(10) Patent No.: US 10,614,802 B2
(45) Date of Patent: *Apr. 7, 2020

(54) METHOD AND DEVICE FOR RECOGNIZING SPEECH BASED ON CHINESE-ENGLISH MIXED DICTIONARY

(71) Applicant: BAIDU ONLINE NETWORK TECHNOLOGY (BEIJING) CO., LTD., Beijing (CN)

(72) Inventors: Xiangang Li, Beijing (CN); Xuewei Zhang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 135 days.

This patent is subject to a terminal disclaimer.

(21) Appl. No.: 15/860,706

(22) Filed: Jan. 3, 2018

(65) Prior Publication Data

US 2018/0322867 A1    Nov. 8, 2018

(30) Foreign Application Priority Data

May 4, 2017    (CN) .......................... 2017 1 0309321

(51) Int. Cl.
*G10L 15/187*    (2013.01)
*G10L 15/22*    (2006.01)
(Continued)

(52) U.S. Cl.
CPC .......... *G10L 15/187* (2013.01); *G06F 40/242* (2020.01); *G10L 15/02* (2013.01);
(Continued)

(58) Field of Classification Search
CPC ..................................................... G10L 15/187
(Continued)

(56) References Cited

U.S. PATENT DOCUMENTS 8,296,127 B2 * 10/2012 Marcu ................ G06F 17/2809
704/2
8,666,725 B2 * 3/2014 Och .................... G06F 17/2818
704/2
(Continued)

OTHER PUBLICATIONS

Li, "How to use Deep CNN to significantly improve recognition accuracy," Heart of Machine interview, Nov. 2016, pp. 1-6.
(Continued)

*Primary Examiner* — Susan I McFadden
(74) *Attorney, Agent, or Firm* — Hodgson Russ LLP

(57) ABSTRACT

Embodiments of the present disclosure provide a method and a device for recognizing a speech based on a Chinese-English mixed dictionary. The method includes acquiring a Chinese-English mixed dictionary marked by an international phonetic alphabet, in which, the Chinese-English mixed dictionary includes a Chinese dictionary and an English dictionary revised by Chinglish; by taking the Chinese-English mixed dictionary as a training dictionary, taking a one-layer Convolutional Neural Network and a five-layer Long Short-Term Memory as a model, taking syllables or words as a target and taking a connectionist temporal classifier as a training criterion, training the model to obtain a trained CTC acoustic model; and performing a speech recognition on a Chinese-English mixed language based on the trained CTC acoustic model.

20 Claims, 5 Drawing Sheets

(51) Int. Cl.
  *G10L 15/06* (2013.01)
  *G10L 15/02* (2006.01)
  *G10L 15/16* (2006.01)
  *G06F 40/242* (2020.01)

(52) U.S. Cl.
  CPC ............ *G10L 15/063* (2013.01); *G10L 15/16* (2013.01); *G10L 15/22* (2013.01); *G10L 2015/025* (2013.01); *G10L 2015/0631* (2013.01); *G10L 2015/0635* (2013.01)

(58) Field of Classification Search
  USPC .......................................................... 704/232
  See application file for complete search history.

(56) References Cited

U.S. PATENT DOCUMENTS

| | | | | |
|---|---|---|---|---|
| 8,694,303 | B2* | 4/2014 | Hopkins | G06F 17/2818 704/2 |
| 8,943,080 | B2* | 1/2015 | Marcu | G06F 17/2827 707/758 |
| 8,977,536 | B2* | 3/2015 | Och | G06F 17/2818 704/2 |
| 9,152,622 | B2* | 10/2015 | Marcu | G06F 17/2854 |
| 2018/0322866 | A1* | 11/2018 | Li | G10L 15/193 |

OTHER PUBLICATIONS

Yu et al. "Research of Chinese-English Bilingual Acoustic Modeling," Journal of Chinese Information Processing, vol. 18, No. 5, 2004, pp. 78-84.

Zhang et al., "Research on Chinese-English bilingual speech recognition," Acta Acustica, vol. 35, No. 2, Mar. 2010, pp. 270-275.

SIPO, First Office Action for CN Application No. 201710309321.3, dated Nov. 12, 2019.

\* cited by examiner

METHOD AND DEVICE FOR RECOGNIZING SPEECH BASED ON CHINESE-ENGLISH MIXED DICTIONARY

CROSS-REFERENCE TO RELATED APPLICATIONS

This application is based on and claims priority to Chinese Patent Application No. 201710309321.3, filed on May 4, 2017, the entire contents of which are incorporated herein by reference.

FIELD

The present disclosure relates to a field of speech recognition technology, and more particularly, to a method and a device for recognizing a speech based on a Chinese-English mixed dictionary.

BACKGROUND

At present, it is common to communicate through mixed languages (or multiple different languages) with the globalization. According to statistics, people who speak multiple languages are greater than those speak a single language. The complexity of acoustics and language between the mixed languages presents a challenge to the speech recognition. Therefore, the study on an acoustic model of the mixed languages becomes an important research aspect.

The speech recognition technology of the mixed languages refers to training the acoustic model of the mixed languages using a Chinese-English mixed dictionary, to obtain a speech recognition model. At present, the Chinese-English mixed dictionary is obtained by obtaining a Chinese dictionary including phoneme sets marked by initial consonants and simple or compound vowels of Chinese syllables, and adding some English words into the Chinese dictionary in a manner of marking the initial consonants and the simple or compound vowels of Chinese syllables. However, the marking of English words is incomplete, time-consuming and manual. Further, the acoustic model of the mixed languages may be for example a deep neural network (DNN for short) acoustic model, a deep convolutional neural network (CNN for short) acoustic model, a long short-term memory (LSTM for short) acoustic model, etc., and its accuracy is not high enough.

SUMMARY

Embodiments of the present disclosure provide a method for recognizing a speech based on a Chinese-English mixed dictionary, including: acquiring a Chinese-English mixed dictionary marked by an International Phonetic Alphabet (IPA for short), in which, the Chinese-English mixed dictionary includes a Chinese dictionary and an English dictionary revised by Chinglish; by taking the Chinese-English mixed dictionary as a training dictionary, taking a one-layer Convolutional Neural Network (CNN for short) and a five-layer Long Short-Term Memory (LSTM for short) as a model, taking syllables or words as a target and taking a Connectionist Temporal Classifier (CTC for short) as a training criterion, training the model to obtain a trained CTC acoustic model; and performing a speech recognition on a Chinese-English mixed language based on the trained CTC acoustic model.

Embodiments of the present disclosure provide a device for recognizing a speech based on a Chinese-English mixed dictionary, including: a processor and a memory configured to store instructions executable by the processor. The processor is configured to perform the above method.

Embodiments of the present disclosure provide a non-transitory computer readable storage medium, when instructions stored therein are executed by a processor of a server, the server is caused to perform the above method.

Embodiments of the present disclosure provide a computer program product, when instructions in the computer program product are executed by a processor, the above method is performed.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
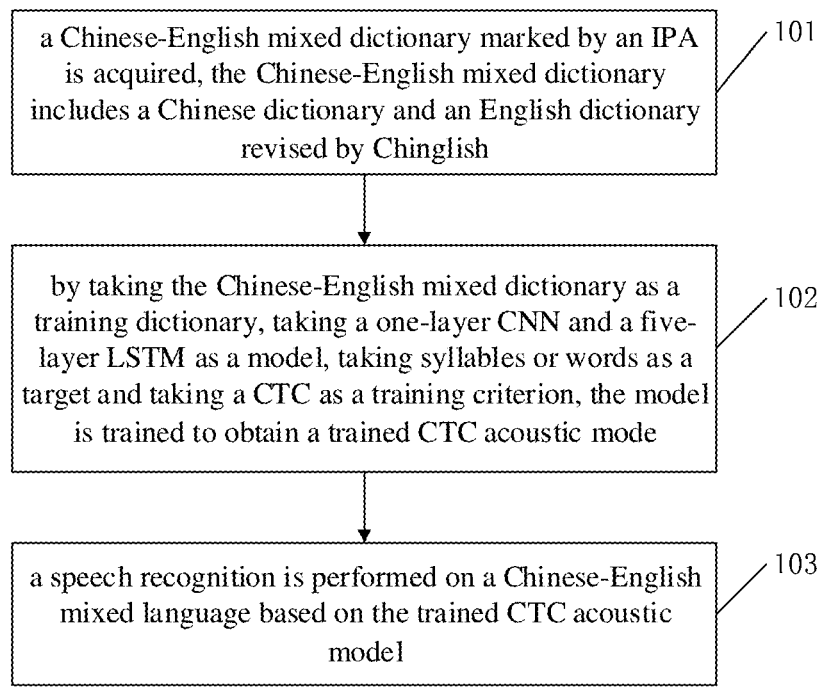
FIG. 1 is a flow chart of a method for recognizing a speech based on a Chinese-English mixed dictionary according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

In the following, a method and a device for recognizing a speech based on a Chinese-English mixed dictionary according to embodiments of the present disclosure will be descripted with reference to drawings.

FIG. 1 is a flow chart of a method for recognizing a speech based on a Chinese-English mixed dictionary according to an embodiment of the present disclosure. As illustrated in FIG. 1, the method for recognizing a speech based on a Chinese-English mixed dictionary includes follows.

At block S101, a Chinese-English mixed dictionary marked by an IPA is acquired. The Chinese-English mixed dictionary includes a Chinese dictionary and an English dictionary revised by Chinglish.

In this embodiment, the Chinese dictionary may be a dictionary such as a Xinhua dictionary which is commonly used, and the dictionary includes each Chinese character and the IPA corresponding to each Chinese character. The English dictionary which is not revised by Chinglish may be a Carnegie Mellon University (CMU for short) pronouncing dictionary. Some phonemes of Chinese and English can be shared.

At block S102, by taking the Chinese-English mixed dictionary as a training dictionary, taking a one-layer CNN and a five-layer LSTM as a model, taking syllables or words as a target and taking a CTC as a training criterion, the model is trained to obtain a trained CTC acoustic mode.

In detail, at block S102, the device for recognizing the speech based on the Chines-English mixed dictionary may extract feature points in a Chinglish sentence using a filter bank (FBANK for short) as inputs of the model first, and train the model by taking the one-layer CNN and the five-layer LSTM as the model, taking a matching file corresponding to the Chinglish sentence as the target and taking a cross entropy (CE for short) as the training criterion, to obtain an initial model, and then train the initial model by taking the Chinese-English mixed dictionary as the training dictionary, taking the initial model as the model, taking the syllables or words as the target and taking the CTC as the training criterion, to obtain the trained CTC acoustic model.

In the present embodiment, by pre-training the model formed by the one-layer CNN and the five-layer LSTM, the model may be converged faster and better, such that the recognition accuracy of the Chinese-English mixed language is improved.

In detail, the matching file corresponding to the Chinglish sentence may be obtained by extracting the feature points in the Chinglish sentence using a 39-dimensional Mel frequency cepstrum coefficient (MFCC for short), and training a Gaussian mixture model (GMM for short) based on pure Chinese and Chinglish data to obtain the matching file corresponding to the Chinglish sentence. The 39-dimensional MFCC feature is obtained by adding a second-order difference to a 13-dimensional MFCC feature.

At block S103, a speech recognition is performed on a Chinese-English mixed language based on the trained CTC acoustic model.

The process of the device for recognizing the speech based on the Chinese-English mixed dictionary performing the speech recognition on the Chinese-English mixed language based on the trained CTC acoustic model may include: acquiring audio data to be recognized, and inputting the audio data to be recognized into the CTC acoustic model, to obtain a sentence including Chinese characters and/or English words corresponding to the audio data to be recognized.

With the method for recognizing a speech based on a Chinese-English mixed dictionary according to embodiments of the present disclosure, by acquiring the Chinese-English mixed dictionary marked by the IPA, the Chinese-English mixed dictionary includes the Chinese dictionary and the English dictionary revised by Chinglish, the model is trained by taking the Chinese-English mixed dictionary as the training dictionary, taking the one-layer CNN and the five-layer LSTM as the model, taking the syllables or words as the target and taking the CTC as the training criterion, to obtain the trained CTC acoustic model, and the speech recognition is performed on the Chinese-English mixed language based on the trained CTC acoustic model. In the present embodiment, by using the Chinese-English mixed dictionary including the Chinese dictionary and the English dictionary revised by Chinglish for training, the English words are comprehensively covered and the Chinglish can be recognized, and the recognition accuracy of the Chinese-English mixed language is improved by using the CTC acoustic model.

Figure 2:
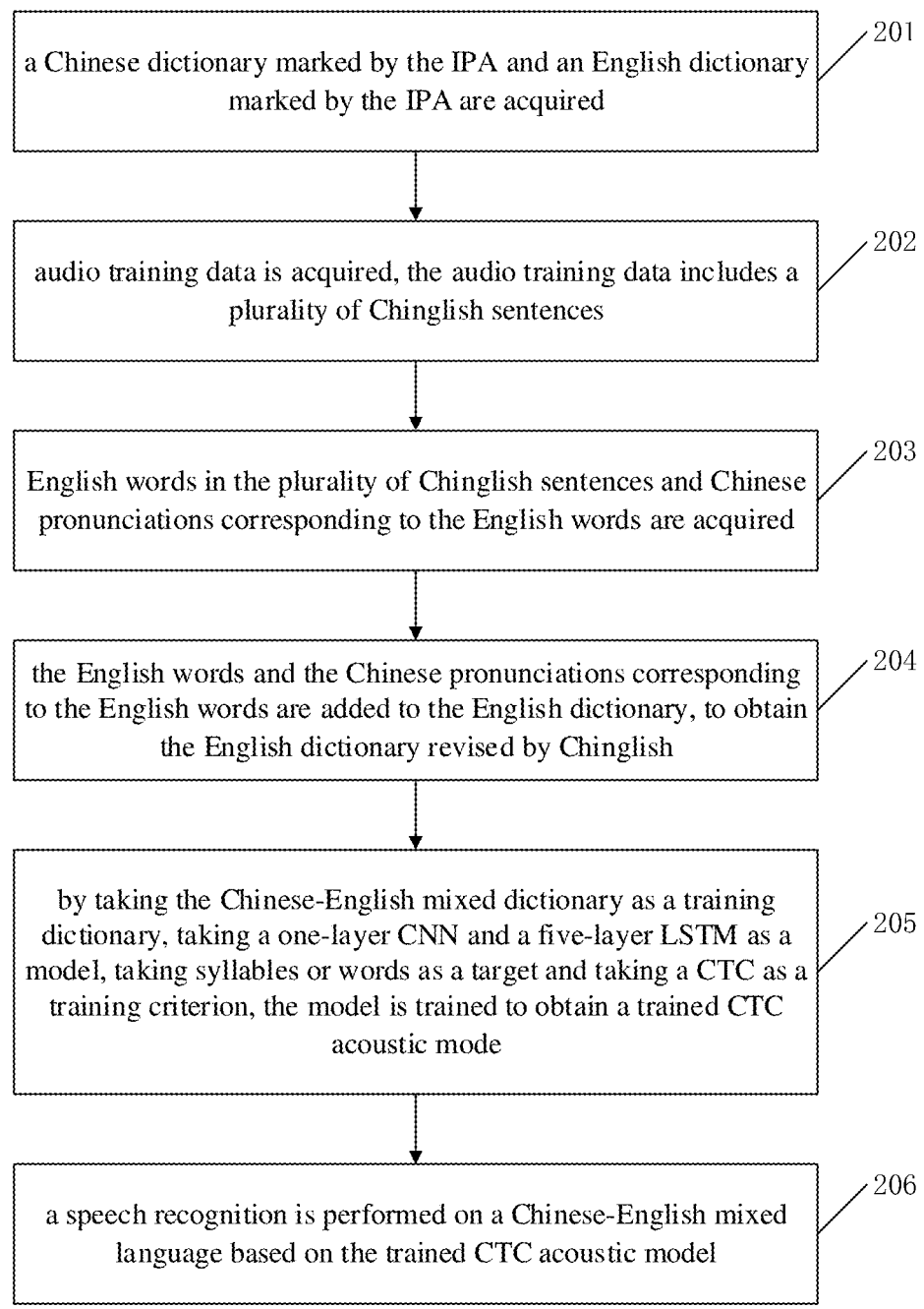
FIG. 2 is a flow chart of a method for recognizing a speech based on a Chinese-English mixed dictionary according to another embodiment of the present disclosure.

FIG. 2 is a flow chart of a method for recognizing a speech based on a Chinese-English mixed dictionary according to another embodiment of the present disclosure. As illustrated in FIG. 2, the method for recognizing a speech based on a Chinese-English mixed dictionary includes follows.

At block S201, a Chinese dictionary marked by the IPA and an English dictionary marked by the IPA are acquired.

At block S202, audio training data is acquired. The audio training data includes a plurality of Chinglish sentences.

In the present embodiment, the Chinglish sentence refers to the sentence that includes both the Chinese characters and the English words, such as "google 一下这个关键词 (Chinese characters)", "这种食物相当 (Chinese characters) good", "你很 (Chinese characters) nice", etc.

At block S203, English words in the plurality of Chinglish sentences and Chinese pronunciations corresponding to the English words are acquired.

The device for recognizing the speech based on the Chinese-English mixed dictionary may obtain text data corresponding to the audio training data, and provide the audio training data and the text data corresponding to the audio training data to a user or other device for analysis, to obtain the English words in the plurality of Chinglish sentences and the Chinese pronunciations corresponding to the English words.

At block S204, the English words and the Chinese pronunciations corresponding to the English words are added to the English dictionary, to obtain the English dictionary revised by Chinglish.

In the present embodiment, in the English dictionary revised by Chinglish, each English word may correspond to multiple pronunciations. For example, the English word may correspond to a standard pronunciation, an American pronunciation, one or more Chinese pronunciations, etc.

At block S205, by taking the Chinese-English mixed dictionary as a training dictionary, taking a one-layer CNN and a five-layer LSTM as a model, taking syllables or words as a target and taking a CTC as a training criterion, the model is trained to obtain a trained CTC acoustic mode.

The Chinese-English mixed dictionary includes the Chinese dictionary and the English dictionary revised by Chinglish.

For specific training process of the model in this embodiment, reference may be made to the training process of the model in embodiments illustrated in FIG. 1, which is not described in detail herein.

At block S206, a speech recognition is performed on a Chinese-English mixed language based on the trained CTC acoustic model.

With the method for recognizing a speech based on a Chinese-English mixed dictionary according to embodiments of the present disclosure, the Chinese dictionary marked by the IPA and the English dictionary marked by the IPA are acquired, the audio training data is acquired, in which, the audio training data includes the plurality of Chinglish sentences, the English words in the plurality of Chinglish sentences and the Chinese pronunciations corresponding to the English words are acquired, the English words and the Chinese pronunciations corresponding to the English words are added to the English dictionary, to obtain the English dictionary revised by Chinglish, the Chinese dictionary and the English dictionary revised by Chinglish are combined to obtain the Chinese-English mixed dictionary marked by the IPA, and then the model is trained by taking the Chinese-English mixed dictionary as the training dictionary, taking the one-layer CNN and the five-layer LSTM as the model, taking the syllables or words as the target and taking the CTC as the training criterion, to obtain the trained CTC acoustic model, and the speech recognition is performed on the Chinese-English mixed language based on the trained CTC acoustic model. In the present embodiment, by using the Chinese-English mixed dictionary including the Chinese dictionary and the English dictionary revised by Chinglish for training, the English words are comprehensively covered and the Chinglish can be recognized, and the recognition accuracy of the Chinese-English mixed language is improved by using the CTC acoustic model.

Figure 3:
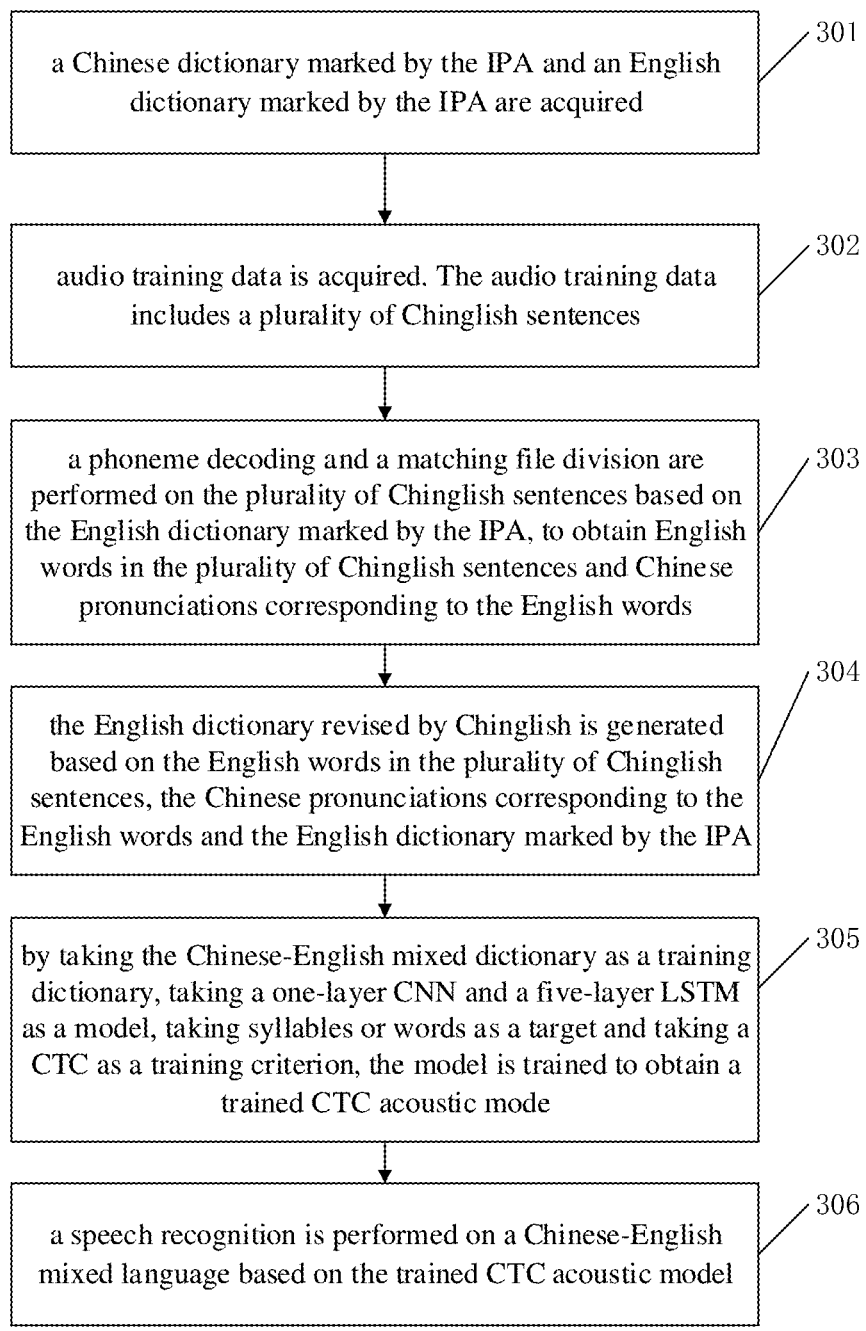
FIG. 3 is a flow chart of a method for recognizing a speech based on a Chinese-English mixed dictionary according to another embodiment of the present disclosure.

FIG. 3 is a flow chart of a method for recognizing a speech based on a Chinese-English mixed dictionary according to another embodiment of the present disclosure. As illustrated in FIG. 3, the method for recognizing a speech based on a Chinese-English mixed dictionary includes follows.

At block S301, a Chinese dictionary marked by the IPA and an English dictionary marked by the IPA are acquired.

At block S302, audio training data is acquired. The audio training data includes a plurality of Chinglish sentences.

At block S303, a phoneme decoding and a matching file division are performed on the plurality of Chinglish sentences based on the English dictionary marked by the IPA, to obtain English words in the plurality of Chinglish sentences and Chinese pronunciations corresponding to the English words.

The process of the device for recognizing the speech based on the Chinese-English mixed dictionary performing S303 may include: performing the phoneme decoding on the plurality of Chinglish sentences based on the English dictionary marked by the IPA, to find an optimal path, to obtain frame positions corresponding to phonemes in the plurality of Chinglish sentences; acquiring a matching file corresponding to the plurality of Chinglish sentences, in which, the matching file includes positions of respective phonemes in the plurality of Chinglish sentences and phonemes corresponding to the English words; and determining positions of respective the English words in the plurality of Chinglish sentences based on the matching file and the frame positions corresponding to the phonemes in the plurality of Chinglish sentences, to divide to obtain the English words in the plurality of Chinglish sentences and the Chinese pronunciations corresponding to the English words.

At block S304, the English dictionary revised by Chinglish is generated based on the English words in the plurality of Chinglish sentences, the Chinese pronunciations corresponding to the English words and the English dictionary marked by the IPA.

In addition, in order to ensure the accuracy of the English words and their Chinese pronunciations added to the English dictionary, before block S304, the method for recognizing the speech based on the Chinese-English mixed dictionary may further include: acquiring word frequencies of respective phonemes in the English word for each English word in the plurality of Chinglish sentences, and acquiring high frequency phonemes whose corresponding word frequencies are greater than a preset word frequency and high frequency English words including the high frequency phonemes.

Accordingly, block S304 may further include: generating the English dictionary revised by Chinglish based on the high frequency English words in the plurality of Chinglish sentences, Chinese pronunciations corresponding to the high frequency English words and the English dictionary marked by the IPA.

In addition, in order to ensure that the English words and their Chinese pronunciations in the audio training data are added to English dictionary as much as possible, after block S304, the method for recognizing the speech based on the Chinese-English mixed dictionary may further include: performing the phoneme decoding and the matching file division on the plurality of Chinglish sentences based on the English dictionary revised by Chinglish, to obtain new English words in the plurality of Chinglish sentences and Chinese pronunciations corresponding to the new English words, and updating the English dictionary revised by Chinglish based on the new English words in the plurality of Chinglish sentences, the Chinese pronunciations corresponding to the new English words and the English dictionary revised by Chinglish. In addition, in order to further ensure that the English words and their Chinese pronunciations in the audio training data are added to English dictionary as much as possible, the above process may be repeated.

At block S305, by taking the Chinese-English mixed dictionary as a training dictionary, taking a one-layer CNN and a five-layer LSTM as a model, taking syllables or words as a target and taking a CTC as a training criterion, the model is trained to obtain a trained CTC acoustic mode.

For specific training process of the model in this embodiment, reference may be made to the training process of the model in embodiments illustrated in FIG. 1, which is not described in detail herein.

At block S306, a speech recognition is performed on a Chinese-English mixed language based on the trained CTC acoustic model.

In the present disclosure, by using the Chinese-English mixed dictionary including the Chinese dictionary and the English dictionary revised by Chinglish for training, the English words are comprehensively covered and the Chinglish can be recognized, and the recognition accuracy of the Chinese-English mixed language is improved by using the CTC acoustic model. In addition, by decoding and dividing the Chinglish sentences, the English words and their Chinese pronunciations in the audio training data are extracted and added to the English dictionary as much as possible, so that the recognition accuracy of the Chinese-English mixed language is further improved.

Figure 4:
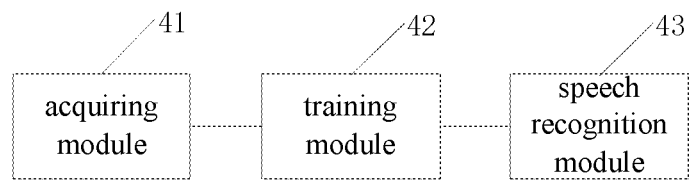
FIG. 4 is a block diagram of a device for recognizing a speech based on a Chinese-English mixed dictionary according to an embodiment of the present disclosure.

FIG. 4 is a block diagram of a device for recognizing a speech based on a Chinese-English mixed dictionary according to an embodiment of the present disclosure. As illustrated in FIG. 4, the device for recognizing the speech based on the Chinese-English mixed dictionary includes an acquiring module 41, a training module 42 and a speech recognition module 43.

The acquiring module 41 is configured to acquire a Chinese-English mixed dictionary marked by an IPA. The Chinese-English mixed dictionary includes a Chinese dictionary and an English dictionary revised by Chinglish.

The training module 42 is configured to, by taking the Chinese-English mixed dictionary as a training dictionary, taking a one-layer CNN and a five-layer LSTM as a model, taking syllables or words as a target and taking a CTC as a training criterion, train the model to obtain a trained CTC acoustic model.

The speech recognition module 43 is configured to perform a speech recognition on a Chinese-English mixed language based on the trained CTC acoustic model.

In the present embodiment, the Chinese dictionary may be a dictionary such as the Xinhua dictionary which is commonly used, and the dictionary includes each Chinese character and the IPA corresponding to each Chinese character. The English dictionary which is not revised by Chinglish may be the Carnegie Mellon University (CMU for short) pronouncing dictionary. Some phonemes of Chinese and English can be shared.

In addition, the training module 42 includes a first training unit and a second training unit.

The first training unit is configured to extract feature points in a Chinglish sentence using a FBANK as inputs of the model, and train the model by taking the one-layer CNN and the five-layer LSTM as the model, taking a matching file corresponding to the Chinglish sentence as the target and taking a Cross Entropy CE as the training criterion, to obtain an initial model.

The second training unit is configured to train the initial model by taking the Chinese-English mixed dictionary as the training dictionary, taking the initial model as the model, taking the syllables or words as the target and taking the CTC as the training criterion, to obtain the trained CTC acoustic model.

In the present embodiment, by pre-training the model formed by the one-layer CNN and the five-layer LSTM, the model may be converged faster and better, such that the recognition accuracy of the Chinese-English mixed language is improved.

In detail, the matching file corresponding to the Chinglish sentence may be obtained by extracting the feature points in the Chinglish sentence using a 39-dimensional Mel frequency cepstrum coefficient (MFCC for short), and training a Gaussian mixture model (GMM for short) based on pure Chinese and Chinglish data to obtain the matching file corresponding to the Chinglish sentence. The 39-dimensional MFCC feature is obtained by adding a second-order difference to a 13-dimensional MFCC feature.

With the device for recognizing a speech based on a Chinese-English mixed dictionary according to embodiments of the present disclosure, by acquiring the Chinese-English mixed dictionary marked by the IPA, the Chinese-English mixed dictionary includes the Chinese dictionary and the English dictionary revised by Chinglish, the model is trained by taking the Chinese-English mixed dictionary as the training dictionary, taking the one-layer CNN and the five-layer LSTM as the model, taking the syllables or words as the target and taking the CTC as the training criterion, to obtain the trained CTC acoustic model, and the speech recognition is performed on the Chinese-English mixed language based on the trained CTC acoustic model. In the present embodiment, by using the Chinese-English mixed dictionary including the Chinese dictionary and the English dictionary revised by Chinglish for training, the English words are comprehensively covered and the Chinglish can be recognized, and the recognition accuracy of the Chinese-English mixed language is improved by using the CTC acoustic model.

Figure 5:
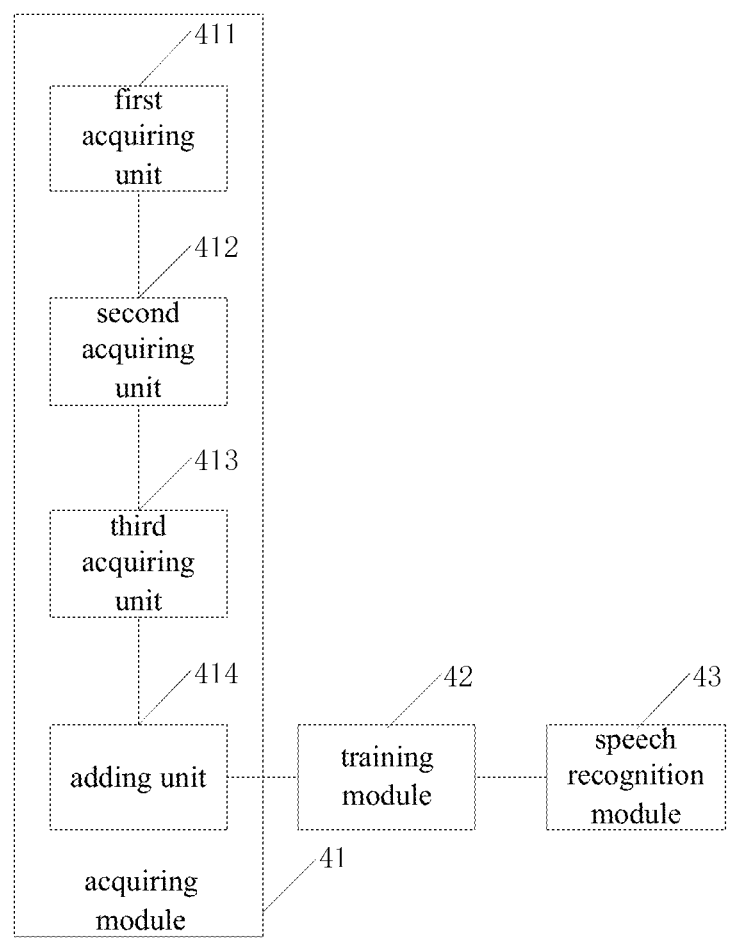
FIG. 5 is a block diagram of a device for recognizing a speech based on a Chinese-English mixed dictionary according to another embodiment of the present disclosure.

FIG. 5 is a block diagram of a device for recognizing a speech based on a Chinese-English mixed dictionary according to another embodiment of the present disclosure. As illustrated in FIG. 5, and on the basis of embodiments illustrated in FIG. 4, the acquiring module 41 includes a first acquiring unit 411, a second acquiring unit 412, a third acquiring unit 413 and an adding unit 414.

The first acquiring unit 411 is configured to acquire a Chinese dictionary marked by the IPA and an English dictionary marked by the IPA.

The second acquiring unit 412 is configured to acquire audio training data. The audio training data includes a plurality of Chinglish sentences.

The third acquiring unit 413 is configured to acquire English words in the plurality of Chinglish sentences and Chinese pronunciations corresponding to the English words.

The adding unit 414 is configured to add the English words and the Chinese pronunciations corresponding to the English words to the English dictionary, to obtain the English dictionary revised by Chinglish.

In the present embodiment, in the English dictionary revised by Chinglish, each English word may correspond to multiple pronunciations. For example, the English word may correspond to a standard pronunciation, an American pronunciation, one or more Chinese pronunciations, etc.

Figure 6:
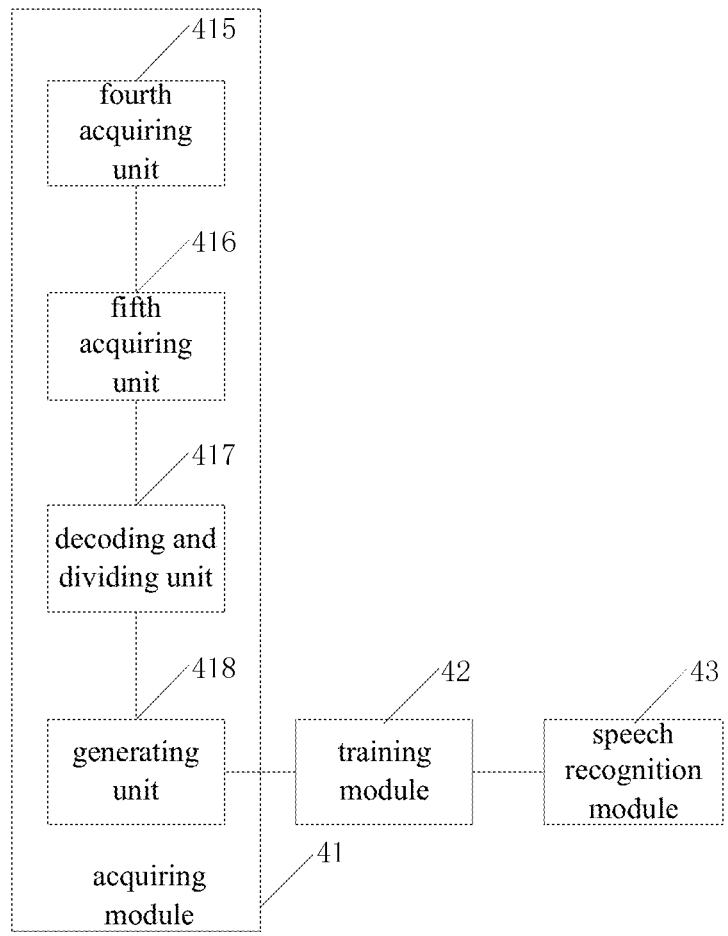
FIG. 6 is a block diagram of a device for recognizing a speech based on a Chinese-English mixed dictionary according to another embodiment of the present disclosure.

FIG. 6 is a block diagram of a device for recognizing a speech based on a Chinese-English mixed dictionary according to another embodiment of the present disclosure. As illustrated in FIG. 6, and on the basis of embodiments illustrated in FIG. 4, the acquiring module 41 includes a fourth acquiring unit 415, a fifth acquiring unit 416, a decoding and dividing unit 417 and a generating unit 418.

The fourth acquiring unit 415 is configured to acquire a Chinese dictionary marked by the IPA and an English dictionary marked by the IPA.

The fifth acquiring unit 416 is configured to acquire audio training data. The audio training data includes a plurality of Chinglish sentences.

The decoding and dividing unit 417 is configured to perform a phoneme decoding and a matching file division on the plurality of Chinglish sentences based on the English dictionary marked by the IPA, to obtain English words in the plurality of Chinglish sentences and Chinese pronunciations corresponding to the English words.

The generating unit 418 is configured to generate the English dictionary revised by Chinglish based on the English words in the plurality of Chinglish sentences, the Chinese pronunciations corresponding to the English words and the English dictionary marked by the IPA.

In detail, the decoding and dividing unit 417 includes a decoding subunit, a first acquiring subunit and a dividing subunit.

The decoding subunit is configured to perform the phoneme decoding on the plurality of Chinglish sentences based on the English dictionary marked by the IPA, to find an optimal path, to obtain frame positions corresponding to phonemes in the plurality of Chinglish sentences.

The first acquiring subunit is configured to acquire a matching file corresponding to the plurality of Chinglish sentences, in which, the matching file includes positions of respective phonemes in the plurality of Chinglish sentences and phonemes corresponding to the English words The dividing subunit is configured to determine positions of respective the English words in the plurality of Chinglish sentences based on the matching file and the frame positions corresponding to the phonemes in the plurality of Chinglish sentences, to divide to obtain the English words in the plurality of Chinglish sentences and the Chinese pronunciations corresponding to the English words.

In addition, in order to ensure the accuracy of the English words and their Chinese pronunciations added to the English dictionary, the decoding and dividing unit includes a second acquiring subunit and a third acquiring subunit.

The second acquiring subunit is configured to acquire word frequencies of respective phonemes in the English word for each English word in the plurality of Chinglish sentences.

The third acquiring module is configured to acquire high frequency phonemes whose word frequencies are greater than a preset word frequency and high frequency English words including the high frequency phonemes.

Accordingly, the generating unit 418 is configured to generate the English dictionary revised by Chinglish based on the high frequency English words in the plurality of Chinglish sentences, Chinese pronunciations corresponding to the high frequency English words and the English dictionary marked by the IPA.

In addition, in order to ensure that the English words and their Chinese pronunciations in the audio training data are added to English dictionary as much as possible, the acquiring module 41 further includes a re-decoding and dividing unit and an updating unit.

The re-decoding and dividing unit is configured to perform the phoneme decoding and the matching file division on the plurality of Chinglish sentences based on the English dictionary revised by Chinglish, to obtain new English words in the plurality of Chinglish sentences and the Chinese pronunciations corresponding to the new English words.

The updating unit is configured to update the English dictionary revised by Chinglish based on the new English words in the plurality of Chinglish sentences, Chinese pronunciations corresponding to the new English words and the English dictionary revised by Chinglish.

In addition, in order to further ensure that the English words and their Chinese pronunciations in the audio training data are added to English dictionary as much as possible, the re-decoding and dividing unit and the updating unit may be repeated.

In the present disclosure, by using the Chinese-English mixed dictionary including the Chinese dictionary and the English dictionary revised by Chinglish for training, the English words are comprehensively covered and the Chinglish can be recognized, and the recognition accuracy of the Chinese-English mixed language is improved by using the CTC acoustic model. In addition, by decoding and dividing the Chinglish sentence, the English words and their Chinese pronunciations in the audio training data are extracted and added to English dictionary as much as possible, so that the recognition accuracy of the Chinese-English mixed language is further improved.

Figure 7:
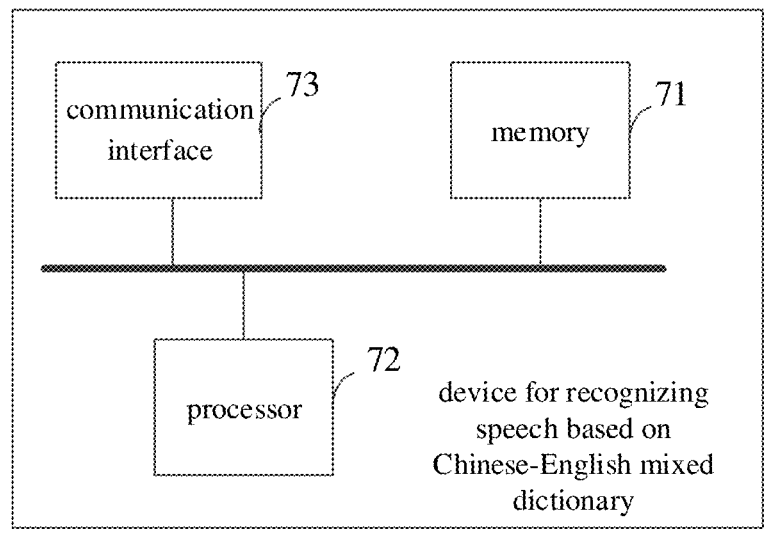
FIG. 7 is a block diagram of another device for recognizing a speech based on a Chinese-English mixed dictionary according to an embodiment of the present disclosure.

FIG. 7 is a block diagram of another device for recognizing a speech based on a Chinese-English mixed dictionary according to an embodiment of the present disclosure. The device for recognizing a speech based on a Chinese-English mixed dictionary includes a memory 71, a processor 72 and computer programs stored in the memory 71 and executable by the processor 72.

The processor 72 is configured to perform the method for recognizing a speech based on a Chinese-English mixed dictionary according to the above embodiments.

In addition, the device for recognizing a speech based on a Chinese-English mixed dictionary further includes a communication interface 73.

The communication interface 73 is configured for communication between the memory 71 and the processor 72.

The memory 71 is configured to store computer programs executable by the processor 72.

The memory 71 may include a high-speed RAM memory, and may also include a non-volatile memory, such as at least one magnetic disk memory.

When programs are executed by the processor 72, the processor 72 is caused to implement the method for recognizing a speech based on a Chinese-English mixed dictionary described in the above embodiments.

When the memory 71, the processor 72 and the communication interface 73 are independently implemented, the communication interface 73, the memory 71 and the processor 72 may be connected to each other and communicate with each other through a bus. The bus may be an industry standard architecture (ISA) bus, a peripheral component (PCI) bus, or an extended industry standard architecture (EISA) bus, etc. The bus can be divided into an address bus, a data bus, a control bus, and the like. For ease of illustration, only one bold line is illustrated in FIG. 7, but it does not mean that there is only one bus or one type of bus.

In at least one embodiment, in an implementation, when the memory 71, the processor 72 and the communication interface 73 are integrated on a chip, the memory 71, the processor 72 and the communication interface 73 may communicate with each other through an internal interface.

The processor 72 may be a central processing unit (CPU for short), an application specific integrated circuit (ASIC for short), or one or more integrated circuit configured to implement the embodiments of the present disclosure.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance or to imply the number of indicated technical features. In addition, unless specified otherwise, "a plurality of" means two or more than two.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for recognizing a speech based on a Chinese-English mixed dictionary, comprising:
    acquiring a Chinese-English mixed dictionary marked by an International Phonetic Alphabet IPA, wherein, the Chinese-English mixed dictionary comprises a Chinese dictionary and an English dictionary revised by Chinglish;
    by taking the Chinese-English mixed dictionary as a training dictionary, taking a one-layer Convolutional Neural Network CNN and a five-layer Long Short-Term Memory LSTM as a model, taking syllables or words as a target and taking a Connectionist Temporal Classifier CTC as a training criterion, training the model to obtain a trained CTC acoustic model; and
    performing a speech recognition on a Chinese-English mixed language based on the trained CTC acoustic model.

2. The method according to claim 1, wherein acquiring the Chinese-English mixed dictionary marked by the IPA comprises:
    acquiring a Chinese dictionary marked by the IPA and an English dictionary marked by the IPA;
    acquiring audio training data, wherein, the audio training data comprises a plurality of Chinglish sentences;
    acquiring English words in the plurality of Chinglish sentences and Chinese pronunciations corresponding to the English words; and
    adding the English words and the Chinese pronunciations corresponding to the English words to the English dictionary, to obtain the English dictionary revised by Chinglish.

3. The method according to claim 1, wherein acquiring the Chinese-English mixed dictionary marked by the IPA comprises:
    acquiring a Chinese dictionary marked by the IPA and an English dictionary marked by the IPA;
    acquiring audio training data, wherein, the audio training data comprises a plurality of Chinglish sentences;
    performing a phoneme decoding and a matching file division on the plurality of Chinglish sentences based on the English dictionary marked by the IPA, to obtain English words in the plurality of Chinglish sentences and Chinese pronunciations corresponding to the English words; and
    generating the English dictionary revised by Chinglish based on the English words in the plurality of Chinglish sentences, the Chinese pronunciations corresponding to the English words and the English dictionary marked by the IPA.

4. The method according to claim 3, wherein performing the phoneme decoding and the matching file division on the plurality of Chinglish sentences based on the English dictionary marked by the IPA, to obtain the English words in the plurality of Chinglish sentences and the Chinese pronunciations corresponding to the English words comprises:
    performing the phoneme decoding on the plurality of Chinglish sentences based on the English dictionary marked by the IPA, to find an optimal path, to obtain frame positions corresponding to phonemes in the plurality of Chinglish sentences;
    acquiring a matching file corresponding to the plurality of Chinglish sentences, wherein, the matching file comprises positions of respective phonemes in the plurality of Chinglish sentences and phonemes corresponding to the English words; and
    determining positions of respective the English words in the plurality of Chinglish sentences based on the matching file and the frame positions corresponding to the phonemes in the plurality of Chinglish sentences, to divide to obtain the English words in the plurality of Chinglish sentences and the Chinese pronunciations corresponding to the English words.

5. The method according to claim 3, before generating the English dictionary revised by Chinglish based on the English words in the plurality of Chinglish sentences, the Chinese pronunciations corresponding to the English words and the English dictionary marked by the IPA, further comprising:
    acquiring word frequencies of respective phonemes in the English word for each English word in the plurality of Chinglish sentences;
    acquiring high frequency phonemes whose corresponding word frequencies are greater than a preset word frequency and high frequency English words comprising the high frequency phonemes;
    generating the English dictionary revised by Chinglish based on the English words in the plurality of Chinglish sentences, the Chinese pronunciations corresponding to the English words and the English dictionary marked by the IPA comprises:
    generating the English dictionary revised by Chinglish based on the high frequency English words in the plurality of Chinglish sentences, Chinese pronunciations corresponding to the high frequency English words and the English dictionary marked by the IPA.

6. The method according to claim 3, after generating the English dictionary revised by Chinglish based on the English words in the plurality of Chinglish sentences, the Chinese pronunciations corresponding to the English words and the English dictionary marked by the IPA, further comprising:
    performing the phoneme decoding and the matching file division on the plurality of Chinglish sentences based on the English dictionary revised by Chinglish, to obtain new English words in the plurality of Chinglish sentences and Chinese pronunciations corresponding to the new English words; and
    updating the English dictionary revised by Chinglish based on the new English words in the plurality of Chinglish sentences, the Chinese pronunciations corresponding to the new English words and the English dictionary revised by Chinglish.

7. The method according to claim 1, wherein, by taking the Chinese-English mixed dictionary as the training dictionary, taking the one-layer CNN and the five-layer LSTM as the model, taking syllables or words as the target and taking the CTC as the training criterion, training the model to obtain the trained CTC acoustic model comprises:
    extracting feature points in a Chinglish sentence using a filter bank FBANK as inputs of the model, and training the model by taking the one-layer CNN and the five-layer LSTM as the model, taking a matching file corresponding to the Chinglish sentence as the target and taking a Cross Entropy CE as the training criterion, to obtain an initial model; and
    training the initial model by taking the Chinese-English mixed dictionary as the training dictionary, taking the initial model as the model, taking the syllables or words as the target and taking the CTC as the training criterion, to obtain the trained CTC acoustic model.

8. A device for recognizing a speech based on a Chinese-English mixed dictionary, comprising:
    a memory;
    a processor; and
    computer programs stored in the memory and executable by the processor,
    wherein when the processor executes the computer programs, a method for recognizing a speech based on a Chinese-English mixed dictionary is performed, the method comprising:
    acquiring a Chinese-English mixed dictionary marked by an International Phonetic Alphabet IPA, wherein, the Chinese-English mixed dictionary comprises a Chinese dictionary and an English dictionary revised by Chinglish;
    by taking the Chinese-English mixed dictionary as a training dictionary, taking a one-layer Convolutional Neural Network CNN and a five-layer Long Short-Term Memory LSTM as a model, taking syllables or words as a target and taking a Connectionist Temporal Classifier CTC as a training criterion, training the model to obtain a trained CTC acoustic model; and
    performing a speech recognition on a Chinese-English mixed language based on the trained CTC acoustic model.

9. The device according to claim 8, wherein acquiring the Chinese-English mixed dictionary marked by the IPA comprises:
    acquiring a Chinese dictionary marked by the IPA and an English dictionary marked by the IPA;
    acquiring audio training data, wherein, the audio training data comprises a plurality of Chinglish sentences;
    acquiring English words in the plurality of Chinglish sentences and Chinese pronunciations corresponding to the English words; and
    adding the English words and the Chinese pronunciations corresponding to the English words to the English dictionary, to obtain the English dictionary revised by Chinglish.

10. The device according to claim 8, wherein acquiring the Chinese-English mixed dictionary marked by the IPA comprises:
    acquiring a Chinese dictionary marked by the IPA and an English dictionary marked by the IPA;
    acquiring audio training data, wherein, the audio training data comprises a plurality of Chinglish sentences;
    performing a phoneme decoding and a matching file division on the plurality of Chinglish sentences based on the English dictionary marked by the IPA, to obtain English words in the plurality of Chinglish sentences and Chinese pronunciations corresponding to the English words; and
    generating the English dictionary revised by Chinglish based on the English words in the plurality of Chinglish sentences, the Chinese pronunciations corresponding to the English words and the English dictionary marked by the IPA.

11. The device according to claim 10, wherein the method further comprises:
    performing the phoneme decoding on the plurality of Chinglish sentences based on the English dictionary marked by the IPA, to find an optimal path, to obtain frame positions corresponding to phonemes in the plurality of Chinglish sentences;
    acquiring a matching file corresponding to the plurality of Chinglish sentences, wherein, the matching file comprises positions of respective phonemes in the plurality of Chinglish sentences and phonemes corresponding to the English words; and
    determining positions of respective the English words in the plurality of Chinglish sentences based on the matching file and the frame positions corresponding to the phonemes in the plurality of Chinglish sentences, to divide to obtain the English words in the plurality of Chinglish sentences and the Chinese pronunciations corresponding to the English words.

12. The device according to claim 10, wherein the method further comprises:
  acquiring word frequencies of respective phonemes in the English word for each English word in the plurality of Chinglish sentences;
  acquiring high frequency phonemes whose corresponding word frequencies are greater than a preset word frequency and high frequency English words comprising the high frequency phonemes;
  generating the English dictionary revised by Chinglish based on the English words in the plurality of Chinglish sentences, the Chinese pronunciations corresponding to the English words and the English dictionary marked by the IPA comprises:
  generating the English dictionary revised by Chinglish based on the high frequency English words in the plurality of Chinglish sentences, Chinese pronunciations corresponding to the high frequency English words and the English dictionary marked by the IPA.

13. The device according to claim 10, wherein the method further comprises:
  performing the phoneme decoding and the matching file division on the plurality of Chinglish sentences based on the English dictionary revised by Chinglish, to obtain new English words in the plurality of Chinglish sentences and Chinese pronunciations corresponding to the new English words; and
  updating the English dictionary revised by Chinglish based on the new English words in the plurality of Chinglish sentences, the Chinese pronunciations corresponding to the new English words and the English dictionary revised by Chinglish.

14. The device according to claim 8, wherein, by taking the Chinese-English mixed dictionary as the training dictionary, taking the one-layer CNN and the five-layer LSTM as the model, taking syllables or words as the target and taking the CTC as the training criterion, training the model to obtain the trained CTC acoustic model comprises:
  extracting feature points in a Chinglish sentence using a filter bank FBANK as inputs of the model, and training the model by taking the one-layer CNN and the five-layer LSTM as the model, taking a matching file corresponding to the Chinglish sentence as the target and taking a Cross Entropy CE as the training criterion, to obtain an initial model; and
  training the initial model by taking the Chinese-English mixed dictionary as the training dictionary, taking the initial model as the model, taking the syllables or words as the target and taking the CTC as the training criterion, to obtain the trained CTC acoustic model.

15. A non-transitory computer readable storage medium, configured to store computer programs, wherein when the computer programs are executed by a processor, a method for recognizing a speech based on a Chinese-English mixed dictionary is performed, the method comprising:
  acquiring a Chinese-English mixed dictionary marked by an International Phonetic Alphabet IPA, wherein, the Chinese-English mixed dictionary comprises a Chinese dictionary and an English dictionary revised by Chinglish;
  by taking the Chinese-English mixed dictionary as a training dictionary, taking a one-layer Convolutional Neural Network CNN and a five-layer Long Short-Term Memory LSTM as a model, taking syllables or words as a target and taking a Connectionist Temporal Classifier CTC as a training criterion, training the model to obtain a trained CTC acoustic model; and
  performing a speech recognition on a Chinese-English mixed language based on the trained CTC acoustic model.

16. The non-transitory computer readable storage medium according to claim 15, wherein acquiring the Chinese-English mixed dictionary marked by the IPA comprises:
  acquiring a Chinese dictionary marked by the IPA and an English dictionary marked by the IPA;
  acquiring audio training data, wherein, the audio training data comprises a plurality of Chinglish sentences;
  acquiring English words in the plurality of Chinglish sentences and Chinese pronunciations corresponding to the English words; and
  adding the English words and the Chinese pronunciations corresponding to the English words to the English dictionary, to obtain the English dictionary revised by Chinglish.

17. The non-transitory computer readable storage medium according to claim 15, wherein acquiring the Chinese-English mixed dictionary marked by the IPA comprises:
  acquiring a Chinese dictionary marked by the IPA and an English dictionary marked by the IPA;
  acquiring audio training data, wherein, the audio training data comprises a plurality of Chinglish sentences;
  performing a phoneme decoding and a matching file division on the plurality of Chinglish sentences based on the English dictionary marked by the IPA, to obtain English words in the plurality of Chinglish sentences and Chinese pronunciations corresponding to the English words; and
  generating the English dictionary revised by Chinglish based on the English words in the plurality of Chinglish sentences, the Chinese pronunciations corresponding to the English words and the English dictionary marked by the IPA.

18. The non-transitory computer readable storage medium according to claim 17, wherein the method further comprises:
  performing the phoneme decoding on the plurality of Chinglish sentences based on the English dictionary marked by the IPA, to find an optimal path, to obtain frame positions corresponding to phonemes in the plurality of Chinglish sentences;
  acquiring a matching file corresponding to the plurality of Chinglish sentences, wherein, the matching file comprises positions of respective phonemes in the plurality of Chinglish sentences and phonemes corresponding to the English words; and
  determining positions of respective the English words in the plurality of Chinglish sentences based on the matching file and the frame positions corresponding to the phonemes in the plurality of Chinglish sentences, to divide to obtain the English words in the plurality of Chinglish sentences and the Chinese pronunciations corresponding to the English words.

19. The non-transitory computer readable storage medium according to claim 17, wherein the method further comprises:
  acquiring word frequencies of respective phonemes in the English word for each English word in the plurality of Chinglish sentences;
  acquiring high frequency phonemes whose corresponding word frequencies are greater than a preset word frequency and high frequency English words comprising the high frequency phonemes;
  generating the English dictionary revised by Chinglish based on the English words in the plurality of Chinglish sentences, the Chinese pronunciations corresponding to the English words and the English dictionary marked by the IPA comprises:

generating the English dictionary revised by Chinglish based on the high frequency English words in the plurality of Chinglish sentences, Chinese pronunciations corresponding to the high frequency English words and the English dictionary marked by the IPA.

20. The non-transitory computer readable storage medium according to claim 17, wherein the method further comprises:

performing the phoneme decoding and the matching file division on the plurality of Chinglish sentences based on the English dictionary revised by Chinglish, to obtain new English words in the plurality of Chinglish sentences and Chinese pronunciations corresponding to the new English words; and updating the English dictionary revised by Chinglish based on the new English words in the plurality of Chinglish sentences, the Chinese pronunciations corresponding to the new English words and the English dictionary revised by Chinglish.

* * * * *